Patented Apr. 18, 1933

1,904,381

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

REFINING OF HYDROCARBON OILS

No Drawing.  Application filed November 11, 1929. Serial No. 406,523.

This invention relates to the treatment of hydrocarbon oils, and in particular to cracked hydrocarbon oils. It refers especially to the treatment of such oils in the vapor phase.

Heretofore, petroleum distillates have been treated in the vapor phase by passing the vapors through earthy material, such as fuller's earth, for the purpose of removing undesirable substances from the distillates but such processes have been directed primarily to the removal of color forming compounds. Such processes have not been suitable for the removal of sulphur compounds, for even the simplest types present in petroleum distillates have been practically unaffected by the process. On the contrary, it is believed that sulphur compounds inhibit the proper action of the fuller's earth in refining the distillates.

In the present practice of the art, the oil vapors, for example, cracked hydrocarbon vapors, are passed through a bed or layer of fuller's earth which removes such compounds as the diolefins, or highly unsaturated compounds, presumably by the type of chemical action known as polymerization. It has been noted that the reaction is not so effective and the yield of distillate per ton of clay considerably cut down by the presence of sulphur compounds in the oil vapors. The present invention, therefore, has for its purpose the promotion of the action of adsorbent earth by removing, in whole or in part, some of the interfering sulphur compounds which in itself is a desirable aim. In particular, the earthy adsorbent material such as fuller's earth, active clays, beauxite, etc., is mixed with alkaline substances, such as sodium hydroxide, calcium oxide, potassium hydroxide, or mixtures of these, for example, the commercial mixture referred to as soda lime. In some cases it has been found useful to add to the mixture a small quantity of a metallic oxide, such as lead oxide for the purpose of reacting with some specific sulphur compound such as mercaptans. Also the introduction of steam air or oxygen in small quantities is beneficial.

In carrying out the process any suitable apparatus permitting the passage of the vapors through the treating mixture may be used. The vapors may be passed upwardly or downwardly and necessary arrangements are made for the withdrawal of liquid products.

As an example, a mixture containing 75% of fuller's earth and 20% soda lime and 5% lead oxide is placed in a container suitably connected to a still and a condenser. A pressure distillate of 52 Baumé gravity containing 85% gasoline and 15% pressure distillate bottoms is subjected to distillation conditions so that the gasoline vapor passes through the mixture. The resulting gasoline had a Baumé gravity of 57.5, an initial boiling point of 105° F., an end point of 435° F., a Saybolt color plus 25 and was stable both in storage and on a reasonable exposure to sunlight. The sulphur content of the pressure distillate was 0.5% and that of the resulting gasoline was 0.15%. Similar results were obtained when distilling end point gasoline directly through the equipment. The process is adapted to be directly connected to a cracking unit or to a re-run still, and vapors corresponding to the boiling range of any desired product may be treated.

I claim:

1. A process of refining cracked hydrocarbon distillates containing highly unsaturated hydrocarbons which comprises passing the same in vapor form thru adsorbent earthy material containing soda lime.

2. A process of refining cracked hydrocarbon distillates containing highly unsaturated hydrocarbons which comprises passing the same in vapor form thru adsorbent earthy material containing soda lime and a lead oxide.

In testimony whereof I affix my signature.

JACQUE C. MORRELL.